Sept. 20, 1949.　　　　B. P. TOTH　　　　2,482,603
BUSHING FOR TOOLHOLDERS
Filed April 20, 1945

INVENTOR
Barnabas P. Toth
BY
Wooster & Davis
ATTORNEYS

Patented Sept. 20, 1949

2,482,603

UNITED STATES PATENT OFFICE 2,482,603

BUSHING FOR TOOLHOLDERS

Barnabas P. Toth, Bridgeport, Conn., assignor to Barnaby Manufacturing and Tool Company, Bridgeport, Conn., a partnership Application April 20, 1945, Serial No. 589,319

6 Claims. (Cl. 279—45)

This invention relates to a bushing for tool holders which forms a clamp for holding tools in the holder, and has for an object to provide a simple and improved form of bushing to permit the mounting and clamping of various sizes and types of tools in the holder, and one in which there is no danger of the clamping shoe of the bushing becoming separated from the bushing and lost, and one in which this clamping shoe is mounted for floating movement so it is always in its proper position in the bushing and may be readily clamped to hold the tool.

With the foregoing and other objects in view, I have devised the construction illustrated in the accompanying drawing forming a part of this specification. It is, however, to be understood the device is not limited to the specific details of construction and arrangement shown, but may embody various changes and modifications within the scope of the invention.

Figure 1:
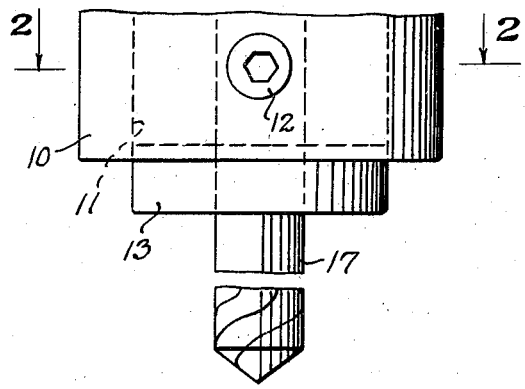
Fig. 1 is a side elevation of one end of a tool holder showing my improved bushing mounted therein and holding a tool.
Figure 4:
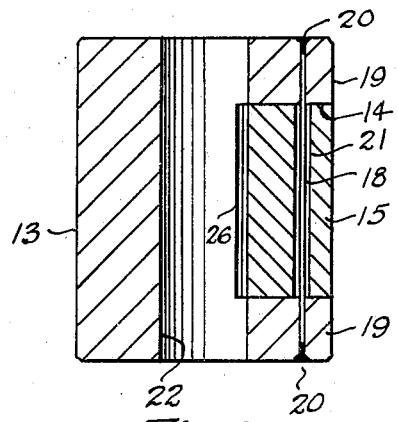
Fig. 4 is a longitudinal section.

This device is a clamping bushing for mounting various tools and also tools of the various sizes in a given tool holder, so that the same holder may be employed for use with a large number of different tools and different sizes of tools, and by which the tools are more accurately and effectively held in the holder. A tool holder is indicated somewhat diagrammatically at 10, used in any machine tool such, for example, as a drill press, boring mill or other machine tool, and has a longitudinal opening or socket 11 extending from its lower end in which a tool or bushing carrying a tool may be mounted and clamped by any suitable means, such for example as a set screw 12.

My improved bushing comprises a body 13 of a diameter to fit the socket or opening 11, and it is provided with a recess 14 opening through its side wall and spaced at its opposite ends inwardly from the opposite ends of this body. The recess preferably extends to substantially the longitudinal center of the body, so that it is substantially semi-cylindrical in cross section. Mounted in this recess is a clamping shoe 15 which is substantially the shape and size of the recess so that it has a good swinging fit at its opposite ends in the recess and has an outer semi-cylindrical surface 16 on a radius substantially that of the body 13 so that when in the closed position it forms a substantial continuation of the outer cylindrical wall of the body.

This clamping shoe 15 is permanently mounted in the recess so that it will not drop out or become lost, but has a floating movement therein so that it is readily clamped against the shank of any of the tools mounted therein, such, for example, as the shank of a drill 17, or of a reamer, tap, boring bar or any other tool adapted for use in this type of holder. To give the shoe 15 its floating action and also always retain it in the body it is hinged in the recess by means of a hinge pin 18 extending longitudinally across the recess 14 with its opposite ends mounted and secured in the portions 19 of the body at the opposite ends of this recess. The pin may be mounted by any suitable means such, for example, as mounting it in an opening drilled through these portions 19 and then after being inserted, being soldered at its opposite ends, as shown at 20, or the end peened over or secured by another suitable means, as desired. This pin passes through a longitudinal opening 21 in the floating clamping shoe 15, and this opening is preferably sufficiently larger than the pin so that the floating shoe is not only hinged on the pin to swing laterally in the body, but also is permitted a certain amount of lateral movement in all directions so that it may properly position itself in the recess in the body and also in the holder, 10, and there would be no danger of its forcing the tool clamped thereby out of position in the holder, but the tool is always properly centered.

Figure 2:
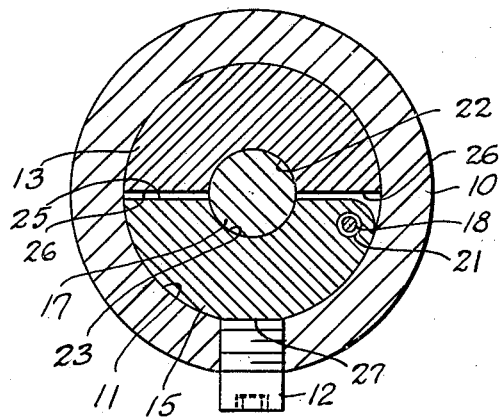
Fig. 2 is a transverse section substantially on line 2—2 of Fig. 1.
Figure 5:
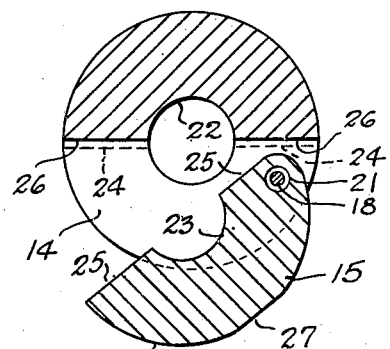
Fig. 5 is a transverse section of the bushing substantially on the same plane as Fig. 2, but showing the bushing removed from the holder and the shoe swung out to the open position.
Figure 3:
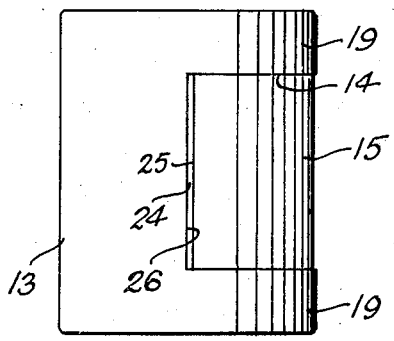
Fig. 3 is a side elevation of the improved bushing removed from the holder.

Longitudinally through the bushing is an opening 22 to receive the shank of the tool, such for example, as the shank of the drill 17, and on the inner side of the floating shoe 15 is a continuation of the other half of the opening 22, as shown at 23. This opening 22 and the portion 23 in the floating shoe are drilled at substantially the size of the shank of the tool to be held therein, such, for example, as the shank of the drill 17, and this opening is drilled when the bushing is clamped in a suitable jig with the floating shoe 15 in the inner or closed position, but with one or more shims 24 placed between the inner wall 25 of the floating shoe and the bottom wall 26 of the recess in the body. It will thus be seen that the opening 22, 23 for the tool shank is drilled when the floating shoe 15 is spaced a short distance from the bottom wall 26 in the recess in the body. After this opening is drilled, the shim or shims are removed, and then when the tool shank is inserted it properly fits the opening in the bushing when the floating clamping shoe 15 is spaced laterally outwardly from the bottom of the recess in the body of the bushing. Therefore, when the bushing with the tool in it is inserted in the tool holder 10 and clamped by the set screw 12 seated against the floating clamp shoe 15, this shoe will be properly and effectively clamped against the shank of the tool, as shown in Fig. 2, holding the tool properly centered and effectively clamped. As the shoe 15 is floating and adapted for lateral movement in all directions it is properly clamped against the shank of the tool and also properly positioned in the tool holder, so that there is no danger of the tool being forced out of position or off center. If desired, the floating clamp shoe 15 may be provided with a flat surface 27 in its outer side surface to form a seat for the set screw 12 to insure that the bushing is properly positioned in the holder and the set screw is clamped most advantageously against the side wall of the shoe.

It will be seen from the above that this makes a very simple construction and one in which the tool is automatically clamped in proper position and the clamping shoe may automatically adjust itself to the proper position during the clamping action of the set screw. When the bushing is removed from the holder or during transportation or storage, there is no danger of the clamping shoe becoming separated from the body and lost or misplaced, or of another or improper shoe being used in the bushing. These bushing blanks can be provided of the proper size for any particular holder 10 and then the different bushings properly drilled at 22, 23, as described above, for the various tools and various sizes of them which it is intended to be used in this holder or any other holder with a similar sized opening or socket.

Having thus set forth the nature of my invention, what I claim is:

1. A bushing for tool holders comprising a cylindrical body adapted to be clamped in a tool holder and provided with a recess spaced inwardly from the opposite ends and opening through a side thereof, a clamping shoe comprising a block in the recess of substantially the same length as the recess and an outer contour forming a substantial continuation of the contour of the body, longitudinally extending pivotal means mounting the shoe in the recess so that it may swing laterally, and a longitudinal opening formed partly in the body and partly in the shoe and of substantially the shape and size of the shank of the tool to be held when the shoe is spaced a short distance from the bottom of the recess, said shoe when the bushing is in a holder adapted to be clamped against the tool shank by the clamping means of the holder.

2. A bushing for tool holders comprising a cylindrical body adapted to be clamped in a tool holder and provided with a recess spaced inwardly from the opposite ends and opening through a side thereof, a clamping shoe comprising a block in the recess of substantially the same length as the recess and an outer contour forming a substantial continuation of the contour of the body, said body and shoe being provided with a longitudinal opening partly in the body and partly in the shoe and of substantially the size and shape of the shank of the tool to be held when the shoe is spaced a short distance from the bottom of the recess, and longitudinal pivotal means securing the shoe in the recess to prevent removal therefrom and comprising loosely fitted parts to permit lateral free floating movement of the shoe.

3. A bushing for tool holders comprising a cylindrical body adapted to be clamped in a tool holder and provided with a recess spaced inwardly from the opposite ends and opening through a side thereof, a clamping shoe comprising a block in the recess of substantially the same length as the recess and an outer contour forming a substantial continuation of the contour of the body, said body and shoe being provided with a central longitudinal opening formed partly in the body and partly in the shoe and of substantially the same diameter as the shank of the tool to be clamped when the shoe is spaced a short distance from the bottom of the recess, a longitudinal hinge pin mounted in the body and extending through the shoe spaced to one side of said opening, and the opening through the shoe for said pin being of larger diameter than the pin to permit lateral free floating movement of the shoe.

4. A bushing for tool holders comprising a body adapted to be clamped in a tool holder and provided with a recess opening through a side wall thereof, a clamping shoe mounted in said recess, said body and shoe being provided with a longitudinal opening formed partly in opposed faces thereof adapted to receive and clamp the shank of a tool when the shoe is spaced a short distance from the bottom of the recess, said shoe being provided with a longitudinal opening spaced laterally from the first opening, and a hinge pin passing through said second opening and mounted in the body to provide a securing pivot for the shoe, and the opening for the pin being of larger diameter than the pin to permit lateral free floating movement of the shoe on the pin.

5. A new article of manufacture comprising a bushing blank for tool holders comprising a cylindrical body adapted to be clamped in a tool holder and provided with a recess opening through a side wall thereof, a clamping shoe in said recess, longitudinally extending pivot means for securing the shoe in the recess to prevent removal therefrom and comprising loosely fitted parts to permit free lateral floating movement of the shoe in the recess, and said body and shoe adapted to be clamped in a jig with the shoe spaced a short distance from the bottom of the recess and drilled with a longitudinal central opening partly in the body and partly in the shoe and of substantially the size of the shank of a tool to be clamped in the bushing.

6. A new article of manufacture comprising a bushing blank for tool holders comprising a cylindrical body adapted to be clamped in a tool holder and provided with a recess opening through a side wall thereof, a clamping shoe in said recess, said shoe being provided with a longitudinal opening adjacent one side thereof, a hinge pin extending through said opening and mounted in the body to secure the shoe in the recess, said opening being of larger diameter than the pin to permit free lateral floating movement of the shoe in the recess, and said body and shoe adapted to be clamped in a jig with the shoe spaced a short distance from the bottom of the recess and drilled with a longitudinal central opening partly in the body and partly in the shoe and of substantially the size of the shank of a tool to be clamped in the bushing.

BARNABAS P. TOTH.

REFERENCES CITED

The following references are of record in the file of this patent:

UNITED STATES PATENTS

| Number | Name | Date |
|---|---|---|
| 718,306 | Boring | Jan. 13, 1903 |
| 799,787 | Gessert | Sept. 19, 1905 |
| 1,783,541 | Hogg et al. | Dec. 2, 1930 |
| 1,984,500 | Tautz | Dec. 18, 1934 |
| 2,355,286 | Fink | Aug. 8, 1944 |

FOREIGN PATENTS

| Number | Country | Date |
|---|---|---|
| 3,014 | Great Britain | 1895 |